(12) United States Patent
Fang et al.

(10) Patent No.: US 6,935,121 B2
(45) Date of Patent: Aug. 30, 2005

(54) RECIPROCATING AND ROTARY MAGNETIC REFRIGERATION APPARATUS

(75) Inventors: Chih-Hsing Fang, Hsinchu Hsien (TW); Wen-Nan Huang, Hsinchu Hsien (TW); Chih-Hsin Chen, Hsinchu Hsien (TW); Wan-Pei Chen, Hsinchu Hsien (TW); Kuo-Ing Hwu, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 6 days.

(21) Appl. No.: 10/726,553

(22) Filed: Dec. 4, 2003

(65) Prior Publication Data

US 2005/0120720 A1    Jun. 9, 2005

(51) Int. Cl.[7] .............................................. F25B 21/00
(52) U.S. Cl. ......................................................... 62/3.1
(58) Field of Search ........................................... 62/3.1

(56) References Cited

U.S. PATENT DOCUMENTS

| | | | |
|---|---|---|---|
| 3,445,740 A | * | 5/1969 | Merkl .......................... 318/117 |
| 4,107,935 A | | 8/1978 | Steyert, Jr. |
| 4,441,325 A | * | 4/1984 | Bon-Mardion et al. ....... 62/3.1 |
| 4,507,928 A | * | 4/1985 | Johnson ........................ 62/3.1 |
| 4,625,519 A | * | 12/1986 | Hakuraku et al. ............ 62/3.1 |
| 4,916,907 A | | 4/1990 | Munk et al. |
| 6,526,759 B2 | | 3/2003 | Zimm et al. |
| 6,595,004 B1 | * | 7/2003 | Ghoshal ........................ 62/3.1 |
| 2003/0106323 A1 | * | 6/2003 | Zimm et al. .................. 62/3.1 |

* cited by examiner

*Primary Examiner*—William C. Doerrler
(74) *Attorney, Agent, or Firm*—Birch, Stewart, Kolasch & Birch, LLP

(57) ABSTRACT

A reciprocating and rotating magnetic refrigeration apparatus adopts a dynamo concept and the design of magnetic supply path and heat transfer unit to alternately magnetize and demagnetize a magnetocaloric material to generate thermo-magnetic effect for cooling. The apparatus includes magnetocaloric material located on the head of stator nose poles, magnetic supply coils surrounding the magnetocaloric material, permanent magnets located on a rotating stator, and a heat transfer unit in contact with the magnetocaloric material. Two adjacent magnetocaloric materials magnetize and demagnetize alternately to alter the temperature and entropy of the magnetocaloric material, and through the heat transfer unit, heat exchange occurs between the magnetocaloric materials and the atmosphere to achieve the cooling effect.

18 Claims, 4 Drawing Sheets

RECIPROCATING AND ROTARY MAGNETIC REFRIGERATION APPARATUS

FIELD OF THE INVENTION

The present invention relates to a magnetic refrigeration apparatus and particularly to a reciprocating and rotary magnetic refrigeration apparatus. The invention uses reconfigured magnetocaloric material and a magnetization and demagnetization mechanism. A Reciprocating and rotary operation alternately magnetizes and demagnetizes the magnetocaloric material. The device is coupled with a design that includes a magnetic supply path and a heat transfer unit to generate a thermomagnetic effect.

BACKGROUND OF THE INVENTION

Warburg first discovered the thermo-magnetic effect in 1881. Warburg found that by placing selected materials in a magnetic field resulted in a temperature increase. Likewise, removing selected materials from the magnetic field causes a reduction in temperature. Thereafter a lot of effort has been devoted to exploring possible applications for the interaction of electromagnetic and thermal energy. Results of the thermo-magnetic effect vary greatly depending on the method of generating the magnetic field, selection of magnetocaloric material and operating procedures. A magnetic refrigeration apparatus is the most tangible application.

Reference found in U.S. Pat. No. 4,916,907 in 1990 to Munk et al, which discloses a magnetic inductor equipped with permanent magnets. However, it does not provide a complete and specific application for the magnetic refrigeration apparatus. U.S. Pat. No. 6,526,759 discloses a design for the magnetic refrigeration apparatus. It mainly uses thermal piping coupled with the difference of thermal spots and adopts a rotating operation to complete thermal circulation. U.S. Pat. No. 4,107,935 discloses a magnetic refrigerator that uses rotating magnetic material. It has a pump to deliver working fluid to a specially designed rotating thermo-magnetic apparatus. The thermo-magnetic apparatus contains magnetocaloric material and rotates continuously in one direction between a strong magnetic field and a weak magnetic field. The working fluid pumps through a complex flow path in the rotating thermo-magnetic apparatus to perform heat exchange with the magnetocaloric material for magnetic refrigeration.

Studies and research related to the thermo-magnetic effect show that magnetic field intensity and magnetic field control are areas that require more work. Permanent magnets are gradually replacing super-conducted material as the magnetic source and can simplify the design of low temperature operating environment. However, most permanently magnetic material used at present have a magnetic intensity of less than 1.5 Tesla. This is not adequate for most magnetic refrigeration applications.

SUMMARY OF THE INVENTION

The primary object of the invention is to provide a reciprocating and rotary magnetic refrigeration apparatus that magnetizes and demagnetizes magnetocaloric material reciprocally in a rotary fashion.

The embodiment according to the invention couples the concept of the rotary dynamo. The approach mainly focuses on generation of a magnetic path; rotary motion employed, achieves this purpose. It includes deploying magnetocaloric material on the nose poles head of the stator coupled with magnetic supply coils. The magnetocaloric material magnetizes and demagnetizes by means of permanent magnets on a rotor and supplies current alternately to two adjacent magnetic supply coils. Altering the temperature and entropy of the magnetocaloric material generates the thermo-magnetic effect. Through a heat transfer unit, heat exchanges between the magnetocaloric material and the atmosphere to achieve the cooling effect.

Another object of the invention is to provide a magnetic refrigeration apparatus that uses permanent magnets to enhance magnetic field intensity.

The apparatus according to the invention has permanent magnets deployed on the stator and rotor. Two adjacent magnetic supply coils alternately receive current to generate magnetic resistance and magnetic torque similar to the way a dynamo attracts a rotor to rotate reciprocally. Through the permanent magnets located on the stator and rotor, the magnetic path forms by the magnetic supply coils surrounding the magnetocaloric material. Magnetization and demagnetization of the magnetocaloric material may help to increase magnetic field intensity.

The aforementioned, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
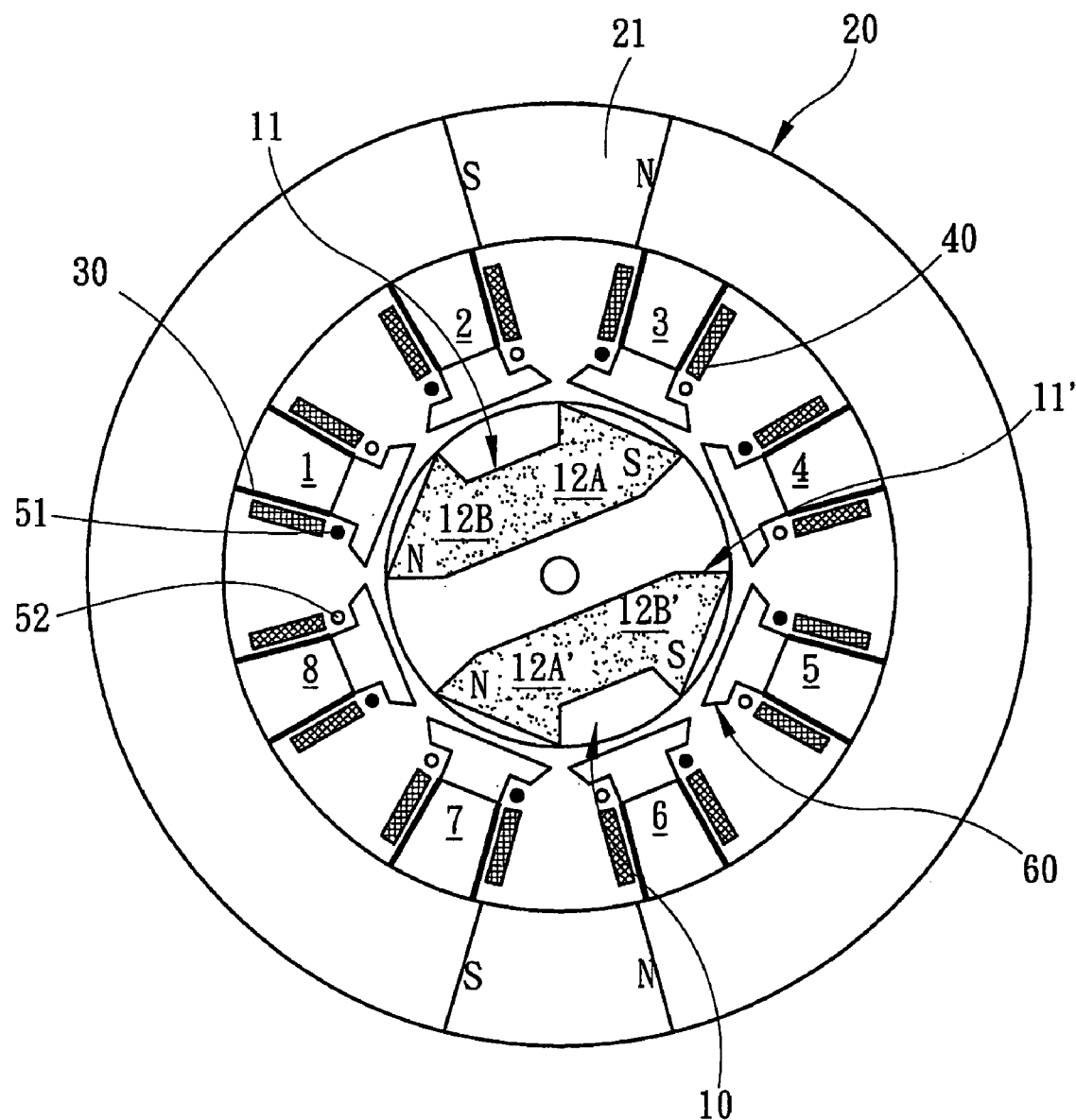
FIG. 1 is a plane view of the present invention.

Please refer to FIG. 1; the reciprocating and rotary magnetic refrigeration apparatus according to the invention includes:

a rotor 10 located in the center of the apparatus including a permanent magnet 11 which has two magnetic poles N and S, which rotate freely;

a stator 20 which is an annular element surrounding the rotor 10. The stator 20 also has a permanent magnet 21, which has two magnetic poles N and S;

Nose pole heads 1–8 are evenly spaced on the inner perimeter of the stator 20. Magnetocaloric materials 30 mount on the surface of each nose pole heads 1–8, respectively. Magnetic supply coils 40 surround the stator nose poles 1–8. Similar to the way a dynamo attracts a rotor to rotate reciprocally. Current alternately feeds into any two adjoining magnetic supply coils 40 to generate magnetic resistance and magnetic torque. The permanent magnet 11 of the rotor 10 and the electromagnetic field of the magnetic supply coils 40 form a magnetic path to magnetize and demagnetize the magnetocaloric material 30, thereby changing the temperature and entropy of the magnetocaloric material 30; and a heat transfer unit including a first heat transfer tube 51 and a second heat transfer tube 52 that are in contact with the magnetocaloric material 30. Through heat transfer of the first heat transfer tube 51 and second heat transfer tube 52, heat exchange between the magnetocaloric material 30 and ambience may be performed to achieve the cooling effect.

There are many materials desirable for use as magnetocaloric materials 30, such as $Dy_3Ga_5O_{12}$, $DyA_{15}O_2$, EuS, Th—Gd, $Er(NiCo)_2$, and the like. The embodiment of the invention employs rare-earth metal Gd (gadolinium), first used to generate the thermo-magnetic effect using conventional techniques.

The permanent magnets 11 and 21 on the rotor 10 and stator 20 aim to boost the magnetic field intensity when the magnetocaloric material 30 is magnetized. In this embodiment, the permanent magnet 11 on the rotor 10 adopts a selected geometric shape such as a horseshoe shape. It has a dimension matching the location of the stator nose poles 1–8. When any two adjacent magnetic supply coils 40 of the stator nose poles 1–8 alternately receive current, an electromagnetic field is generated creating magnetic resistance and magnetic torque similar to that of a dynamo; thus, attracting the permanent magnet 11 of the rotor 10, thereby driving the rotor 10 to rotate reciprocally. Through the magnetic paths jointly formed by the permanent magnets 11 and 21 on the rotor 10 and stator 20 respectively, and the magnetic supply coils 40 surrounding the magnetocaloric material 30, the magnetocaloric material 30 magnetizes. The magnetic field intensity for magnetizing the magnetocaloric material 30 increases.

In the embodiment shown in the drawings, the number of stator nose poles 1–8 is eight, and two permanent magnets 11 and 11' embedded in the rotor 10 each of which are formed in the shape of a horseshoe. Both of the permanent magnets 11 and 11' have two permanent magnetic poles 12A and 12B, or 12A' and 12B'. Hence there are in total, four permanent magnetic poles 12A, 12B, 12A' and 12B'. By designing the permanent magnet 11 in a desired geometric shape, the two permanent magnetic poles 12A and 12B of any permanent magnet 11 may face the two closest stator nose poles (such as stator nose poles 1 and 3) that are not adjacent to each other at the same time. Hence at any given time, the four permanent magnetic poles 12A, 12B, 12A' and 12B' of the two permanent magnets 11 and 11' are attracted to the electromagnetic fields generated by the magnetic supply coils 40 surrounding four stator nose poles (such as stator nose poles 1, 3, 5 and 7). As a result, magnetic paths are established and the magnetocaloric material 30 located on the head of the stator nose poles 1, 3, 5 and 7 are magnetized. According to this principle, an even number of total stator nose poles are used. The number of poles of the permanent magnets 11 embedded in the rotor 10 is one-half the number of the stator nose poles. For instance, in the event that there are three permanent magnets 11 embedded in the rotor 10 and six permanent magnetic poles, the number of the stator nose poles is twelve. Other schemes may be set similarly.

In order to boost the flow of the magnetic path, the distal end of the stator nose poles 1–8 facing the permanent magnetic poles 12A, 12B, 12A' and 12B' of the permanent magnet 11 or 11' may be coupled with a flux concentrator 60. As shown in the drawings, the dimensions of the flux concentrator 60 are greater than the dimensions of the distal end of the stator nose poles 1–8, and are substantially same as the dimensions of the permanent magnetic poles 12A, 12B, 12A' and 12B', thereby increasing magnetic induction capability.

Figure 2A:
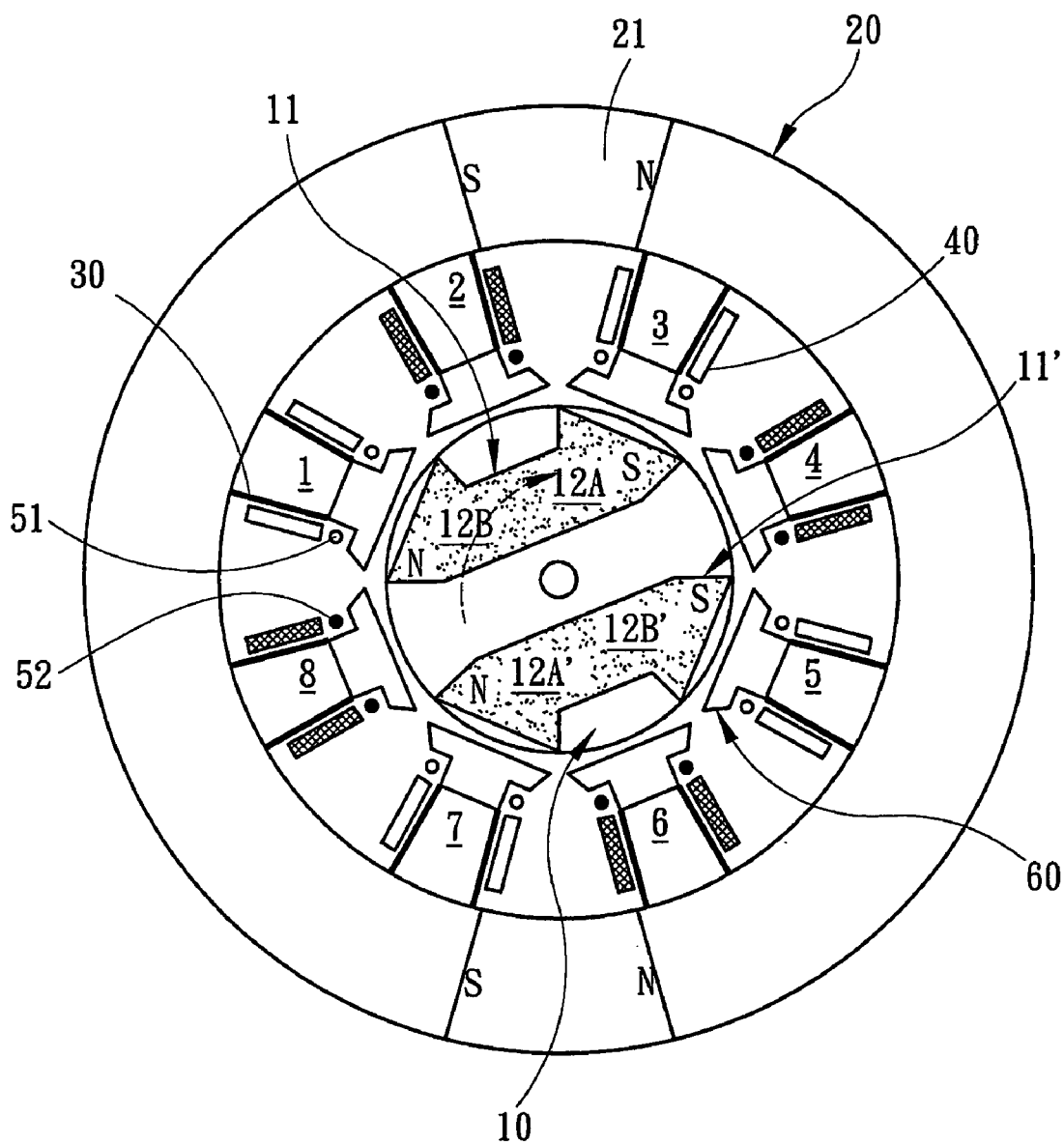
FIGS. 2A and 2B are schematic views of the present invention in operating conditions. They show the rotating action during magnetization and demagnetization operations.
Figure 2B:
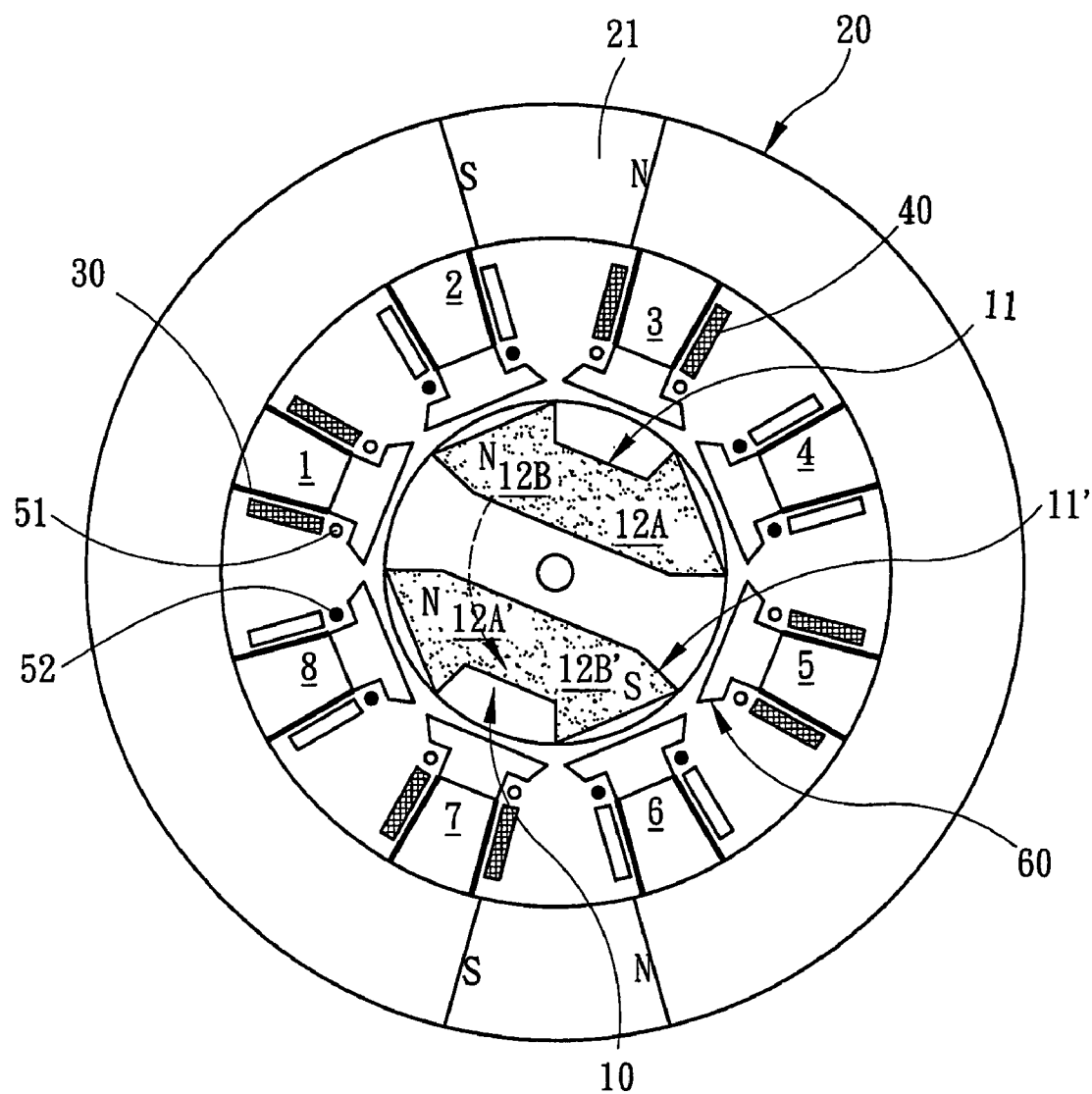

Refer to FIGS. 2A and 2B for the reciprocal rotation of the rotor 10 to generate the thermo-magnetic effect and achieve the cooling function. In the condition shown in FIG. 2A, the permanent magnetic poles 12A, 12B, 12A' and 12B' of the permanent magnets 11 and 11' face respectively the stator nose poles 2, 4, 6 and 8. Meanwhile the magnetic supply coils 40 surrounding the stator nose poles 1, 3, 5 and 7 receive current (the magnetic supply coils 40 having current are marked in black, while the magnetic supply coils 40 with no current are marked in white) and generate an electromagnetic field. Therefore, the permanent magnets 11 and 11' rotate in the direction of the arrow (clockwise). The magnetocaloric material 30 is located on the head of the stator nose poles 1, 3, 5 and 7 magnetize, heat generation occurs and the temperatures rises.

In the condition shown in FIG. 2B, the magnetic supply coils 40 surrounding the stator nose poles 2, 4, 6 and 8 receive current and generate an electromagnetic field. The permanent magnets 11 and 11' rotate in the direction of the arrow (counterclockwise). The magnetocaloric material 30 located on the head of the stator nose poles 2, 4, 6 and 8 magnetize, heat generation occurs and the temperatures rises. By contrast, current supplied to the magnetic supply coils 40 surrounding the stator nose poles 1, 3, 5 and 7, stops. As a result, the magnetocaloric material 30 located on the head of the stator nose poles 1, 3, 5 and 7 are demagnetized heat absorption effect occurs and the temperature drops.

Thus by means of magnetizing and demagnetizing the magnetocaloric material 30 located on the head of the stator nose poles (1, 3, 5, 7 or 2, 4, 6, 8), the magnetocaloric material 30 may produce heat and absorption effects. Heat exchange between the magnetocaloric material 30 and the atmosphere takes place through the first heat transfer tube 51 and the second heat transfer tube 52 that are in contact with the magnetocaloric material 30. This achieves the cooling effect.

The heat transfer unit aims at boosting heat exchange between the magnetocaloric material 30 and the atmosphere, hence the cooling effect. The first heat transfer tube 51 and the second heat transfer tube 52 are siphon type miniature tubes that have partial contact with the surface of the magnetocaloric material 30 on two sides of the stator nose poles 1–8 (as shown in FIG. 1). The rest of the tube sections extend to the atmosphere outside the reciprocating and rotary magnetic refrigeration apparatus. Through the heat transfer function of the first heat transfer tube 51, and the second heat transfer tube 52, heat exchanges between the magnetocaloric material 30 and the atmosphere.

Figure 3:
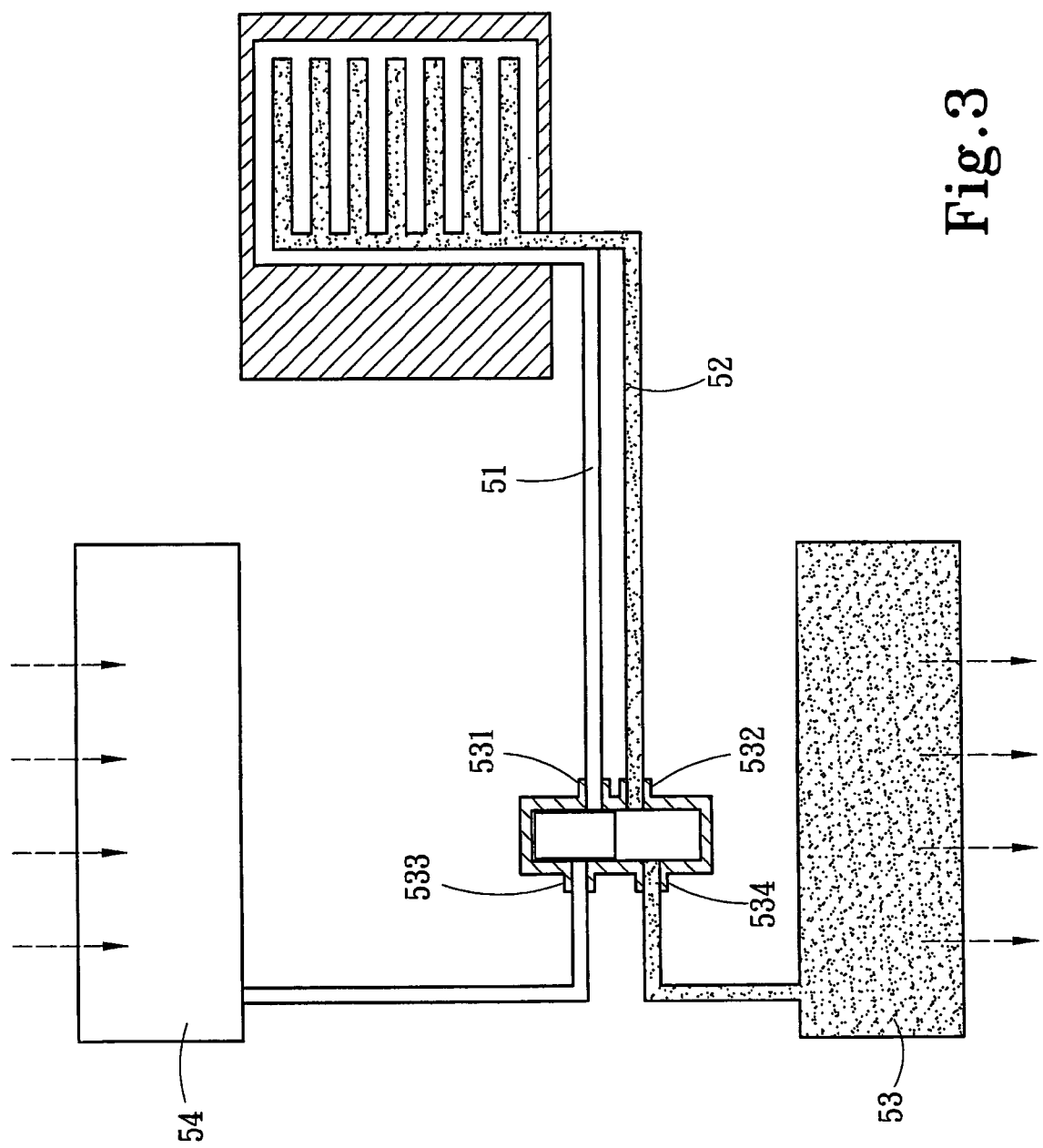
FIG. 3 is a cross section of the embodiment configuration of the heat transfer unit according to the present invention.

Refer to FIG. 3 for an embodiment of the first heat transfer tube 51 and the second heat transfer tube 52. The heat transfer tubes alternate. A flow control valve 53 (such as a 4/2 way valve) is provided to switch heat transfer flow. Namely, the first heat transfer tube 51 and the second heat transfer tube 52 respectively provide heat transfer function for the magnetocaloric material 30 on the head of any two adjacent stator nose poles (1, 3, 5, 7 or 2, 4, 6, 8). As shown in FIG. 1, the first heat transfer tube 51 provides the heat transfer function for the magnetocaloric material 30 on the head of the stator nose poles (1, 3, 5, 7). The second heat transfer tube 52 provides the heat transfer function for the magnetocaloric material 30 on the stator nose poles (2, 4, 6, 8). The flow control valve 53 has a first connection port 531 and a second connection port 532 on one side to connect respectively to the first heat transfer tube 51 and the second heat transfer tube 52. The flow control valve 53 has a third connection port 533 and a fourth connection port 534 on another side to connect respectively to a heat absorption device 54 and a heat discharge device 55. The heat absorption device 54 and heat discharge device 55 are also structures formed by siphon-type miniature tubes; however, their areas are greater than the first heat transfer tube 51 and the second heat transfer tube 52. The heat discharge device 55 aims to transfer heat flow (i.e. discharge heat absorbed by the magnetocaloric material 30 to the atmosphere), while the heat absorption device 54 aims to transfer cold flow (i.e. absorb heat from the atmosphere and transfer it to the cooled magnetocaloric material 30 and thereby achieve cooling). Thus by means of the reciprocating rotary movement of the reciprocating and rotary magnetic refrigeration apparatus, and through switching the flow location with the flow control valve 53; heat generated by the magnetocaloric material 30 may be sent through the first heat transfer tube 51 and the second heat transfer tube 52 to the heat discharge device 55. On the other hand, when the magnetocaloric material 30 is cooling, ambient heat (such as the refrigeration box) absorbed by the heat absorption device 541 can discharge to the magnetocaloric material 30 of a lower temperature through the first heat transfer tube 51 and the second heat transfer tube 52 to perform the cooling function.

The working fluid contained in first heat transfer tube 51 and the second heat transfer tube 52 generally is a mixture of gas and liquid, but this is by no means the limitation. Gas, liquid, nitrogen or helium may also be used.

While the preferred embodiment of the invention has been set forth for the purpose of disclosure, modifications of the disclosed embodiment of the invention as well as other embodiments thereof may occur to those skilled in the art. Accordingly, the appended claims are intend to cover all embodiments that do not depart from the spirit and scope of the invention.

What is claimed is:

1. A reciprocating and rotating magnetic refrigeration apparatus for magnetizing and demagnetizing a magnetocaloric material through reciprocating and rotational motion, comprising:
    a freely rotating rotor located in the center of the apparatus and embedded with permanent magnets;
    an annular stator surrounding the rotor, the stator containing a permanent magnet;
    an even number of equally spaced stator nose poles on the inner perimeter of the stator having their heads attached to the magnetocaloric material;
    magnetic supply coils surrounding the stator nose poles receiving current alternately across two adjoining coils to generate magnetic resistance and magnetic torque to attract the rotor to rotate reciprocally, the permanent magnets of the rotor and the electromagnetic field generated by the magnetic supply coils form a magnetic path alternately to magnetize and demagnetize the magnetocaloric material thereby altering the temperature and entropy of the magnetocaloric material; and
    a heat transfer unit for discharging generated heat energy.

2. The reciprocating and rotational magnetic refrigeration apparatus of claim 1, wherein the number of the permanent magnetic poles embedded in the rotor is one-half of the stator nose poles.

3. The reciprocating and rotary magnetic refrigeration apparatus of claim 1, wherein the permanent magnets embedded in the rotor form a horseshoe shape.

4. The reciprocating and rotary magnetic refrigeration apparatus of claim 1, wherein each of the stator nose poles has one distal end facing the permanent magnets of the rotor, coupled with a flux concentrator.

5. The reciprocating and rotary magnetic refrigeration apparatus of claim 1, wherein the magnetocaloric material is made of a rare earth metal Gadolinium.

6. The reciprocating and rotary magnetic refrigeration apparatus of claim 1, wherein the heat transfer unit includes:
    A first heat transfer tube and a second heat transfer tube in contact with the magnetocaloric material; and
    A flow control valve for processing heat transfer through the heat transfer tubes to perform heat exchange between the magnetocaloric material and atmosphere to achieve the cooling effect.

7. A reciprocating and rotary magnetic refrigeration apparatus for magnetizing and demagnetizing a magnetocaloric material to achieve the cooling effect, comprising:
    a freely rotating rotor located in the center of the apparatus and embedded with permanent magnets;
    an annular stator surrounding the rotor containing a permanent magnet;
    an even number of equally spaced stator nose poles on the inner perimeter of the stator their heads attached to the magnetocaloric material;
    magnetic supply coils surrounding the stator nose poles and receiving current alternately on two adjacent coils to generate magnetic resistance and magnetic torque to attract the rotor to rotate reciprocally, the permanent magnets of the rotor and the electromagnetic field generated by the magnetic supply coils form a magnetic path to alternately magnetize and demagnetize the magnetocaloric material thereby altering the temperature and entropy of the magnetocaloric material; and
    a heat transfer unit for discharging generated heat energy.

8. The reciprocating and rotating magnetic refrigeration apparatus of claim 7, wherein the number of the permanent magnetic poles embedded in the rotor is one-half of the stator nose poles.

9. The reciprocating and rotary magnetic refrigeration apparatus of claim 7, wherein the permanent magnets embedded in the rotor form a horseshoe shape.

10. The reciprocating and rotary magnetic refrigeration apparatus of claim 7, wherein each of the stator nose poles has one distal end facing the permanent magnets of the rotor coupled with a flux concentrator.

11. The reciprocating and rotary magnetic refrigeration apparatus of claim 7, wherein the magnetocaloric material is made of a rare earth metal Gadolinium.

12. The reciprocating and rotary magnetic refrigeration apparatus of claim 7, wherein the heat transfer unit includes a first heat transfer tube and a second heat transfer tube, that the tubes are in contact with the magnetocaloric material for processing heat transfer to perform heat exchange between the magnetocaloric material and atmosphere to achieve the cooling effect.

13. The reciprocating and rotary magnetic refrigeration apparatus of claim 12, wherein the first heat transfer tube and the second heat transfer tube are siphon-type miniature tubes.

14. The reciprocating and rotary magnetic refrigeration apparatus of claim 12, wherein the first heat transfer tube and the second heat transfer tube have respectively partial contact with the magnetocaloric material attached to two lateral surfaces of the stator nose poles, with the remainder extending outside the apparatus.

15. The reciprocating and rotary magnetic refrigeration apparatus of claim 14, wherein the first heat transfer tube and the second heat transfer tube include a flow control valve to switch flow paths, the first heat transfer tube and the second heat transfer tube perform heat transfer for the magnetocaloric material located on any two adjacent stator nose poles.

16. The reciprocating and rotary magnetic refrigeration apparatus of claim 15 further having a heat absorption device and a heat discharge device, the flow control valve has a first connection port and a second connection port on one side thereof to connect respectively to the first heat transfer tube and the second heat transfer tube, a third connection port and a fourth connection port on another side thereof to connect respectively to the heat absorption device and the heat discharge device.

17. The reciprocating and rotary magnetic refrigeration apparatus of claim 16, wherein the heat discharge device absorbs heat generated by the magnetocaloric material and discharges it outdoors, the heat absorption device absorbs heat from the atmosphere and transfers it to the magnetocaloric material cooled by demagnetization.

18. The reciprocating and rotary magnetic refrigeration apparatus of claim 16, wherein the heat absorption device and the heat discharge device are siphon-type miniature tubes that have a greater heat transfer area than the first heat transfer tube and the second heat transfer tube.

* * * * *